United States Patent
Nichols et al.

(10) Patent No.: US 8,345,586 B2
(45) Date of Patent: Jan. 1, 2013

(54) WIRELESS DATA COMMUNICATION SYSTEM AND METHOD

(75) Inventors: Scott Christopher Nichols, Sheffield (GB); Adrian Philip Villiers Ward, Cambridge (GB)

(73) Assignee: NXP B.V., Eindhoven (NL)

( * ) Notice: Subject to any disclaimer, the term of this patent is extended or adjusted under 35 U.S.C. 154(b) by 625 days.

(21) Appl. No.: 12/343,005

(22) Filed: Dec. 23, 2008

(65) Prior Publication Data

US 2010/0157974 A1    Jun. 24, 2010

(51) Int. Cl.
*G08C 17/00*    (2006.01)

(52) U.S. Cl. ..... 370/311; 370/331; 370/350; 370/395.2; 370/469; 455/437; 455/439; 455/515

(58) Field of Classification Search ................. 370/311, 370/312, 328, 331, 332, 333, 400, 401
See application file for complete search history.

(56) References Cited

U.S. PATENT DOCUMENTS

| | | | |
|---|---|---|---|
| 2003/0198196 A1* | 10/2003 | Bahl et al. | 370/311 |
| 2005/0090264 A1* | 4/2005 | Kim | 455/455 |
| 2006/0015917 A1* | 1/2006 | Rozental | 725/111 |
| 2007/0038346 A1* | 2/2007 | Ehrlich et al. | 701/33 |
| 2007/0160049 A1* | 7/2007 | Xie et al. | 370/390 |
| 2007/0297438 A1* | 12/2007 | Meylan et al. | 370/445 |
| 2008/0144584 A1* | 6/2008 | Sugaya | 370/336 |

* cited by examiner

*Primary Examiner* — Bo Hui A Zhu

(57) ABSTRACT

Embodiments of the present invention provide a communication system, comprising: a first wireless network including a coordinator and a plurality of network devices associated with the coordinator; a second wireless network; wherein the first coordinator is arranged to notify at least one network device of the availability of data; and the at least one network device notified of the availability of data is arranged to associate with the second wireless network and to receive the data.

16 Claims, 8 Drawing Sheets

WIRELESS DATA COMMUNICATION SYSTEM AND METHOD

BACKGROUND

The present invention relates to a data communication system and communication method. In particular, although not exclusively, the present invention relates to a communications system and method which may communicate data to a large number of devices.

In some applications, a wireless network is required which supports a large number of devices, allowing data to be communicated amongst those devices with low latency. It is also desired that network devices have low power consumption, thus enabling network devices to be battery powered with minimal maintenance requirements.

For example, electronic shelf edge labelling (ESL) relates to the provision of information in a retail environment using electronic display devices. In a typical ESL system, electronic display devices are mounted upon shelves to display information, such as price information, to customers. Systems such as ESL systems have a number of requirements: they should support large numbers of devices e.g. in excess of 30,000 display devices; they should not require extensive infrastructure to be installed to support shelf-edge devices e.g. power and data cabling; display devices should require minimal maintenance; and the system should have low update latency.

It is an object of embodiments of the invention to at least mitigate one or more of the problems of the prior art.

BRIEF DESCRIPTION OF THE DRAWINGS

Embodiments of the invention will now be described by way of example only, with reference to the accompanying figures, in which.

DETAILED DESCRIPTION OF EMBODIMENTS OF THE INVENTION

Embodiments of the present invention relate to a wireless network for communicating data to end devices. Embodiments of the present invention are described with reference to an electronic shelf edge labelling (ESL) system. In the context of an ESL system, data to be displayed on a display is communicated to end devices. Frequently, data provided to end devices in the ESL system is a data update, such as updated pricing information to be displayed on the display device. It will be realized however that embodiments of the present invention may be used in other data communication environments and applications.

Figure 1:
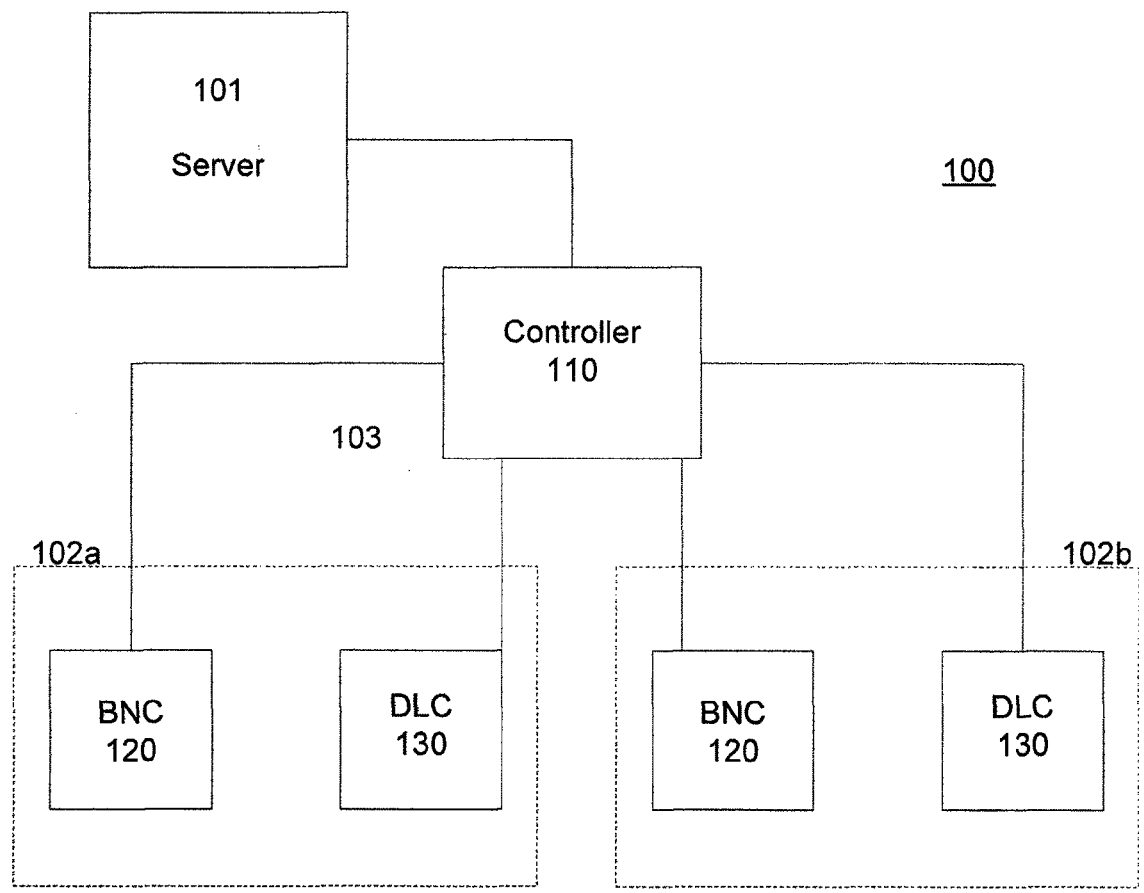
FIG. 1 shows an example of a system according to an embodiment of the present invention.
Figure 1:
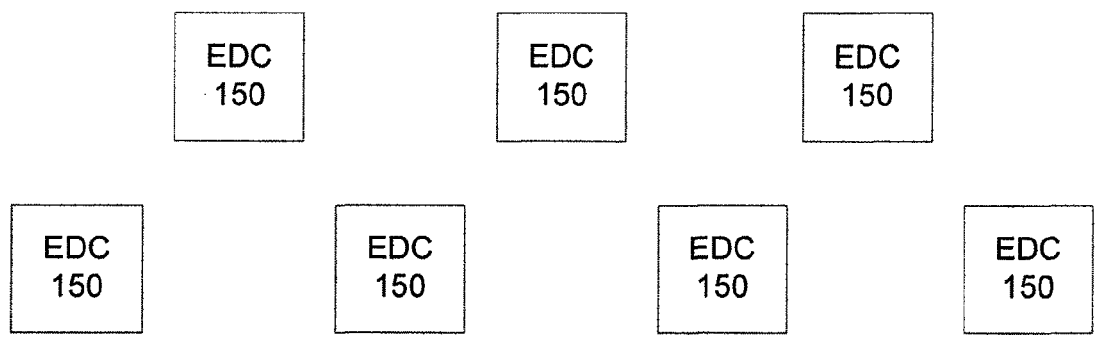

FIG. 1 illustrates an example of an ESL system 100 according to an embodiment of the present invention. The ESL system 100 comprises a server 101 which wirelessly communicates data to one or more end devices (EDCs) 150. The server 101 is in communication with a controller 110 via a communications channel 103 such as a wired communications medium e.g. EIA-485 (RS 485). The controller 110 is communicatively coupled to at least one network head 102 for transmitting data. It will be realized that any communications medium between network head 102 and controller 110 may be used. In the illustrated example, the controller 110 is communicatively coupled to two network heads 102a, 102b, although it will be realized that any number of network heads 102 may be used. Further network heads 102 may be utilized to increase a coverage area of the system 100 or to add capacity for further EDCs 150, allowing parallel updates and/or reducing a network update time, as will be explained. Whilst the sever 101 and controller 110 have been shown as separate entities in FIG. 1, it will be realized that the two may be combined into a single entity e.g. the server 101 may also perform the functions of the controller 110.

Each network head 102a,b comprises a Beacon Network Controller (BNC) 120 and a Down-Link Controller (DLC) 130. Each of the BNC 120 and DLC 130 support respective Wireless Personal Area Networks (WPANs) operating on different RF channels. In the described embodiment, each WPAN is based upon an IEEE 802.15.4 standard. The IEEE 802.15.4-2003 standard, 802.15.4-2006 standard, or the 802.15.4a-2007 standard, which are available from http://www.ieee802.org/15/pub/TG4.html, define low-rate WPANs. A WPAN is a wireless network which requires little or no infrastructure. Two types of device can participate in a WPAN: a full-function device (FFD) and a reduced function device (RFD). The FFD can operate as coordinator or as a device (common node). For further information about WPANs the reader is directed to the above-mentioned standards, which are herein incorporated by reference. Each of the BNC 120 and DLC 130 operate as a coordinator of their respective WPAN.

Figure 2:
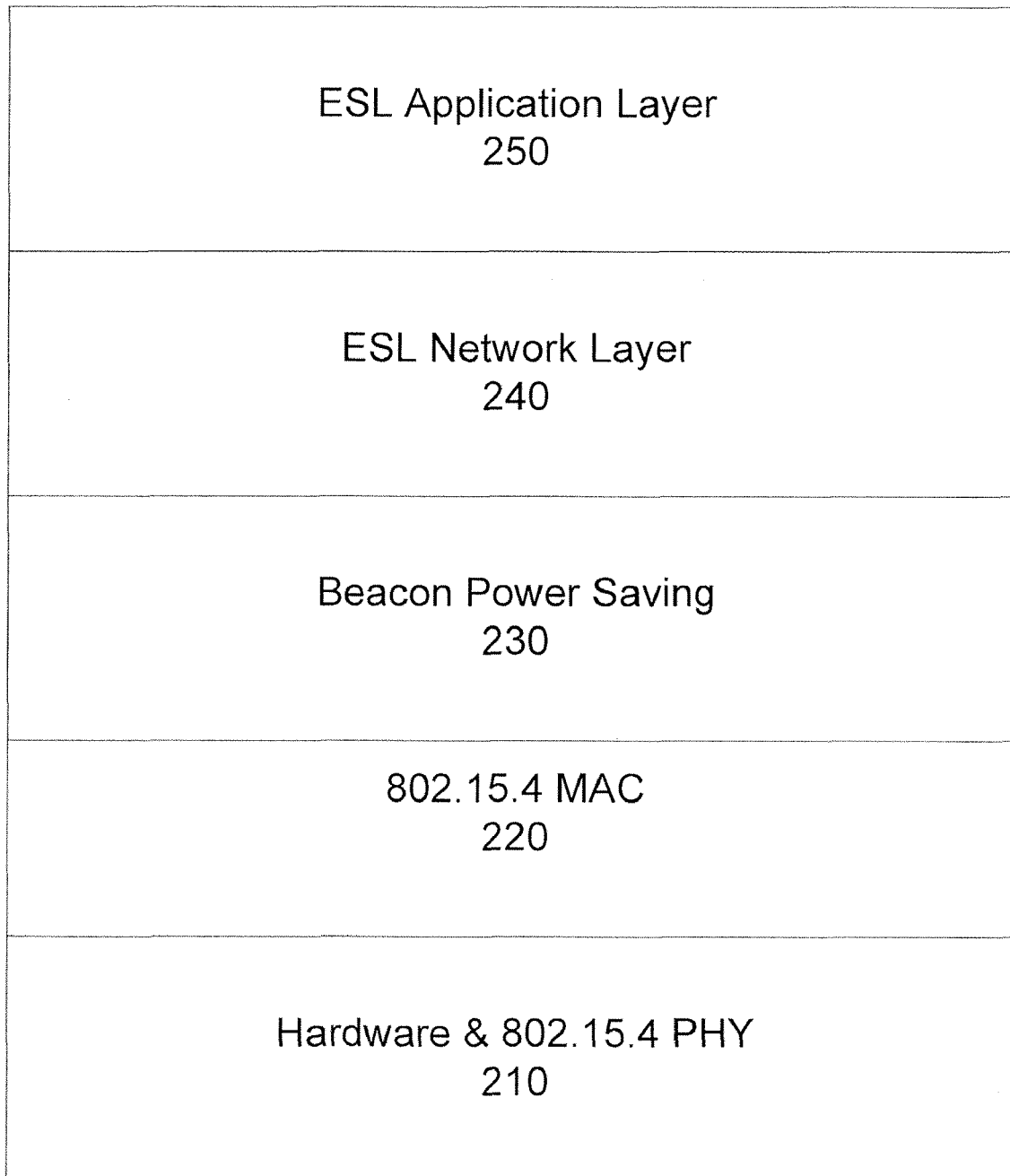
FIG. 2 illustrates a layer structure of embodiments of the present invention.

FIG. 2 shows a structure of a communication system according to an embodiment of the present invention. A protocol stack 200 is formed by hardware and an IEEE 802.15.4 PHY layer 210, on top of which is an IEEE 802.15.4 MAC layer 220. A beacon power saving layer 230 may be provided which enables power saving of devices, as will be explained. An ESL network layer 240 according to embodiments of the invention provides data signalling and communication between devices, as explained below. On top of the ESL network layer 240, an ESL application layer 250 may provide an ESL application.

The controller 110 utilizes the BNC 120 to provide signalling and control information to the EDCs 150. Data is communicated to the EDCs 150 via the DLC 130. The BNC 120 is used to notify an EDC 150 to the presence of data waiting for that EDC 150, which is communicated from the server 110 via the controller 110 and DLC 130 to the EDC 150. Whilst the system has been shown comprising an equal number of BNCs 120 as DLCs 130, it will be realized that embodiments of the present invention may be envisaged which comprise fewer BNCs 120 than DLCs 130. For example, a single BNC 120 may provide signalling and control information to a plurality of EDCs 150, each which downloads data upon instruction of the BNC 120 via one of a plurality of DLCs 130.

The BNC 120 supports two data channels, a Notification Control Channel (NCC) and an Application Control Channel (ACC). The BNC 120 also provides information to assist EDCs 150 in selecting from amongst a plurality of BNCs 120 when the system 100 includes two or more network heads 102.

Figure 3:
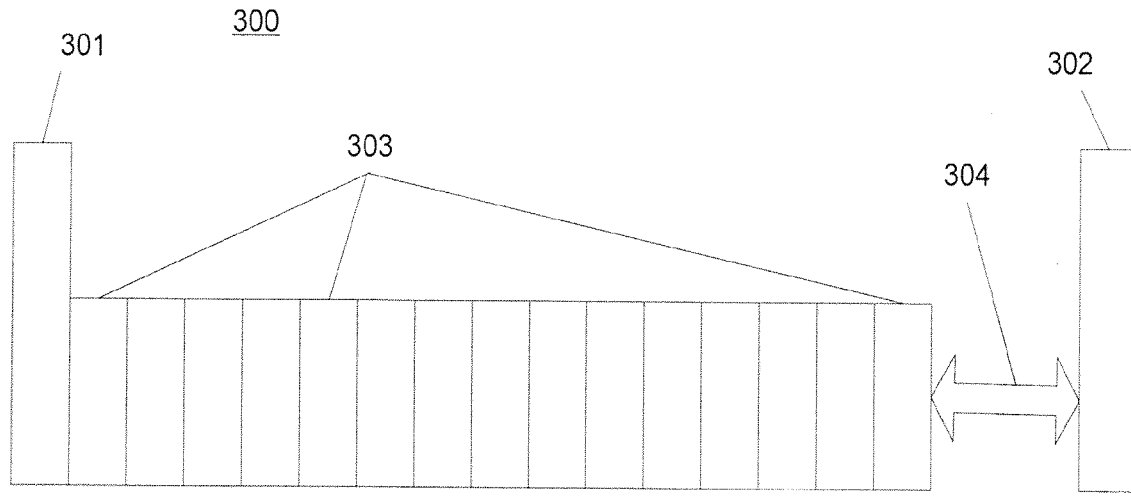
FIG. 3 illustrates a superframe structure.

The controller 110 communicates signalling information to EDCs 150 using beacons supported as part of an IEEE 802.15.4 superframe. Use of a superframe is defined in relation to the MAC sublayer 220 by the IEEE 802.15.4 standard. A superframe is bounded by network beacons. FIG. 3 shows an illustration of a superframe structure 300. In FIG. 3 the superframe structure 300 comprises first and second beacons 301, 302 bounding the superframe 300. The superframe 300 comprises sixteen equally sized timeslots 303 (not all of which are labelled for clarity). A beacon 301, 302 is transmitted in a first timeslot of a superframe 300. Any device wishing to communicate in the remaining timeslots 303 competes with other devices in a contention access period (CAP) using a slotted CSMA-CA mechanism. A superframe 300 may have an active portion, which in FIG. 3 is represented by the CAP, and an inactive portion 304. During the inactive portion the BNC 120 may enter a low-power or sleep mode to conserve power.

In a beacon enabled network WPAN, the coordinator periodically transmits the beacons 301, 302 to network devices. Devices receive the beacons 301, 302 and synchronize to the superframe structure 300. In embodiments of the present invention, the BNC 120 periodically transmits beacons to EDCs 150.

Figure 4:
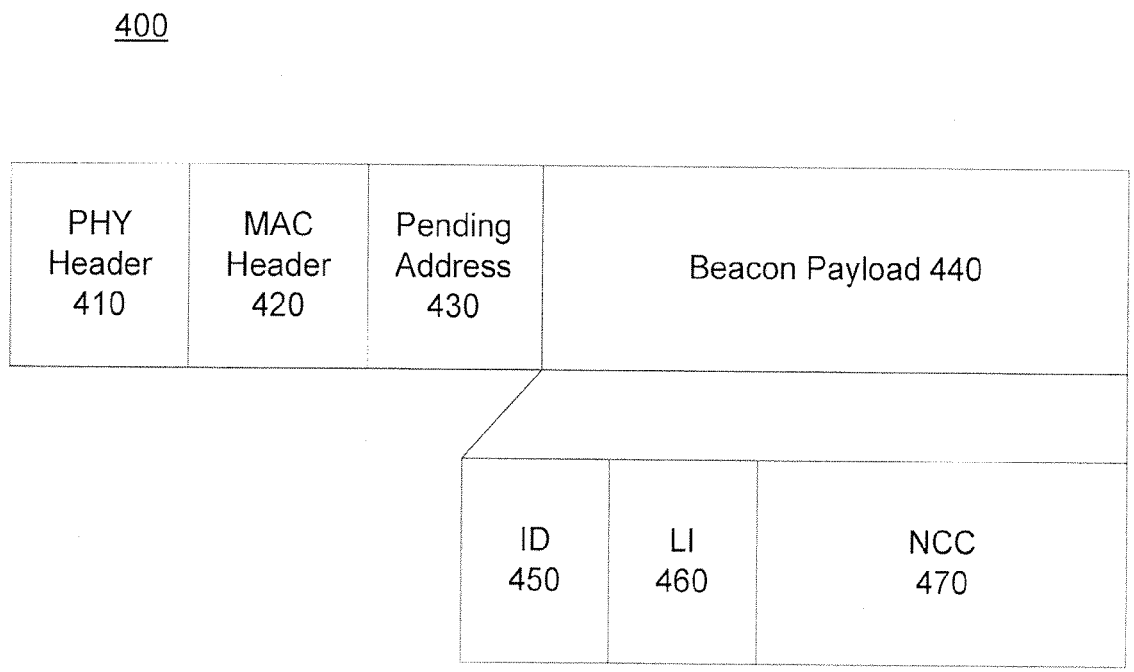
FIG. 4 illustrates a beacon payload format according to an embodiment of the present invention.

An example of the beacon 400 format used in embodiments of the present invention is shown in FIG. 4. A beacon 400 comprises a PHY layer header 410, a MAC layer header 420, an addressing field 430 and a beacon payload field 440, as defined in the IEEE 802.15.4 specification. In embodiments of the present invention, the beacon payload field 440 comprises four fields. An identification (ID) field 450 allows EDCs 150 to identify the beacon 301, 302 as originating from a BNC 120 in the ESL system. For example, the BNC 120 is configured to transmit beacons containing a predetermined ID field 450. On receiving the beacon 400 an EDC 150 is able to verify that the beacon was broadcast from the BNC 120 in the ESL system by the ID field 450 having a predetermined value. A loading indication (LI) field 460 provides an indication to EDCs 150 of a current loading on the BNC 120. In some embodiments, the LI field 460 contains an indication of the number of EDCs 150 associated with the BNC 120 broadcasting the beacon 400. The LI 460 may provide loading information in the form of a percentage loading of that BNC 120. If two or more BNCs 120 are available to an EDC 150, then the EDC 150 may selectively associate with one of the BNCs 120 based upon the LI 460. An NCC field 470 allows for communication of NCC commands to EDCs 150, as will be explained. For example, it will be noted that not all fields are necessarily present in all embodiments and the location of fields in the beacon payload is shown for illustrative purposes. The ACC channel is supported by the pending address field 430, into which a coordinator places an indication that data is waiting for an EDC 150. Once the EDC 150 receives the beacon, it can request the data using slotted CSMA-CA in a timeslot 303.

When the BNC 120 and/or DLC 130 are started, the server 110 determines a channel on which a PAN of the BNC 120 or DLC 130 will operate. A quietest channel to operate on may be selected by the server 110 utilizing a receiver ED measurement from the PHY sublayer 210 of the IEEE 802.15.4 standard. An available PAN ID may then be selected by the server 101 requesting the BNC 120 or DLC 130 to perform a network discovery process to determine if any other PANs are within radio range. To determine if any other PANs are operating, an active scanning process is used to locate coordinator devices transmitting beacons on a channel by sending a beacon request command. The BCN or DLC 120, 130 then enables its radio receiver to receive beacons and records information received in each beacon to allow the server 110 to determine a free PAN ID for use by the BNC 120 or DLC 130. A process of BNC 120 and DLC 130 channel management will be described later.

Upon initialization, an EDC 150 is required to find a BNC 120 network to join. In order to determine WPANs operating within range of the EDC 150, each EDC 150 initiates a passive scan to find any BNCs 120 transmitting beacons. The passive scan is performed on each channel by enabling a receiver of the EDC 150 and recording information contained in any received beacons.

Figure 5:
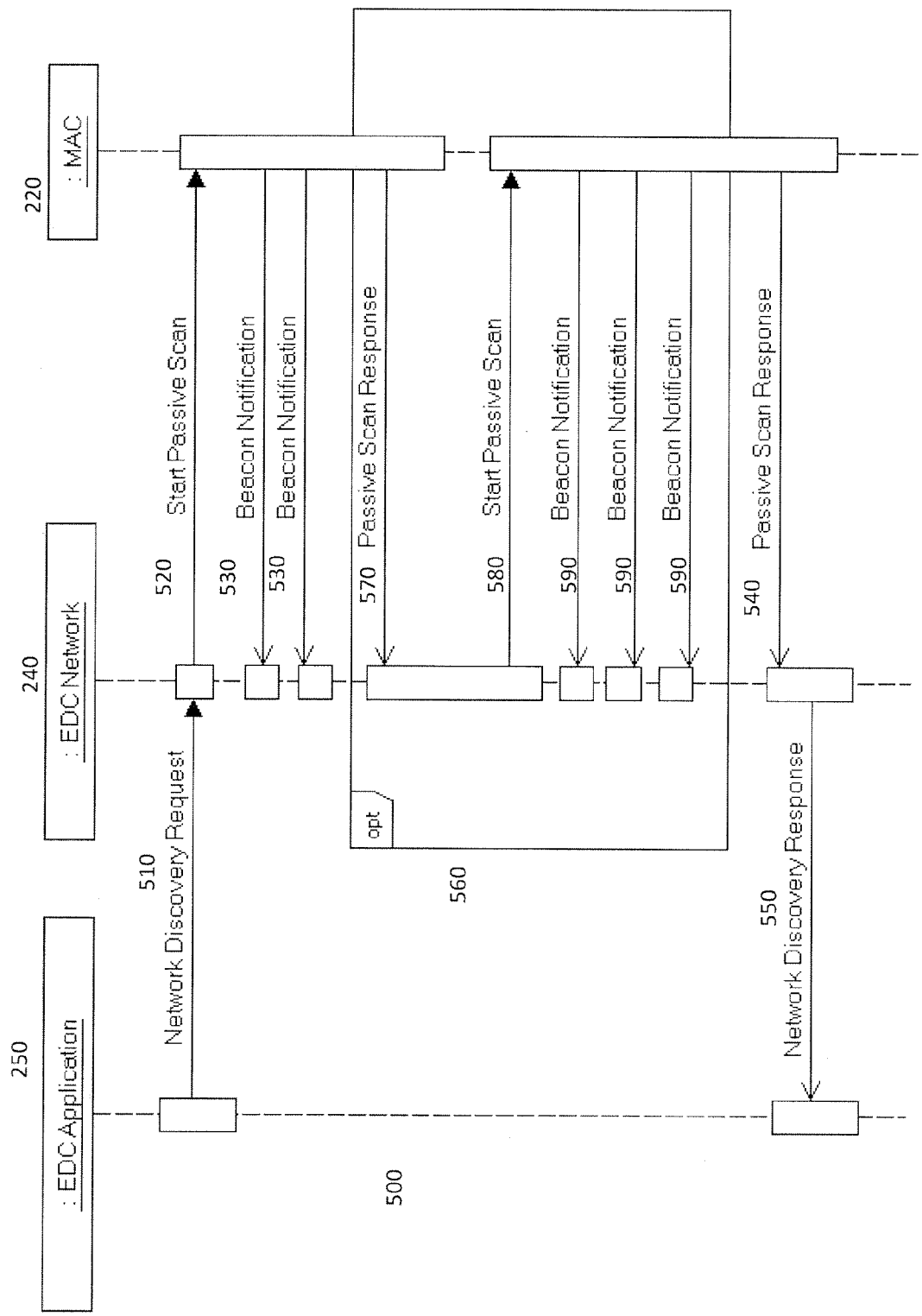
FIG. 5 illustrates a network discovery process according to an embodiment of the present invention.

FIG. 5 shows an example diagram of an EDC 150 network discovery process 500 within the protocol stack 200 of the EDC 150. Communication is shown between the EDC application layer 250, network layer 240 and MAC layer 220. In step 510, a network discovery request 510 is communicated from the application layer 250 to the network layer 240. In response to the request 510, the network layer 240 communicates an instruction 520 to the MAC layer 220 instructing the MAC layer 220 to start a passive scan for network beacons 301, 302. Each time a beacon 301, 302 is received by the EDC 150, a beacon notification 530 is communicated from the MAC layer 220 to the network layer 240. Once all channels have been scanned or 8 beacons 301, 302 have been received, a passive scan response 540 is communicated from the MAC layer to the network layer 240. In response to receiving the passive scan response 540, the network layer 240 communicates a network discovery response 550 to the application layer 220. The network discovery response 550 contains a list of PANs found by the EDC 150 during the passive scan. Optionally, as indicated in box 560, upon receiving a passive scan response 570 from the MAC layer 220, the network layer 240 may pass a further start passive scan message 580 to the MAC layer 220 indicating that a further passive scan of some or all channels is to be performed, which results in further beacon notifications 590 being passed from the MAC layer 200 to the network layer 240 in response to beacons 301, 302 being received. A further passive scan may be required when 8 beacons have been received but not all channels have been scanned. Following the BNC network discovery process 500, the application layer 250 has a list of all BNCs 120 coordinating networks which are available to join by the EDC 150.

As noted above, an EDC 150 determines whether one or more BNCs 120 are available by scanning all available channels to determine an availability of PANs by listening for beacons being broadcast by one or more BNCs 120. When two or more BNCs 120 are available, an EDC 150 may selectively associate with a BNC 120 based upon a signal strength of a received beacon and the LI 460 of each BNC 120. The EDC 150 may utilize a link quality indication (LQI) measurement provided from the PHY sublayer 210 of the IEEE 802.15.4 standard. The EDC 150 may select a BNC 120 having a greatest LQI and, when two BNCs 120 have equal or similar LQIs, the BNC 120 having a lowest LI 320 may be selected. The EDC 150 then associates with the PAN of the selected BNC 120.

Following an EDC 150 associating with the selected BNC 120, an authentication procedure is performed between the application layers 250, 350 of the BNC 120 and EDC 150. The authentication procedure is carried out to ensure that the EDC 150 is permitted to join the PAN of the BNC 120. Authentication data is communicated using the ACC channel 440.

As part of the authentication procedure, the EDC 150 is allocated to a group of one or more EDCs 150 by the communication of a group identification (group ID) to the EDC 150 using the ACC channel. The group ID is used by the BNC 120 to notify a group of EDCs 150 that a data update will follow. As will be explained, sleep intervals of the EDCs 150 in a group are periodically adjusted, in some embodiments of the invention, between times at which it is expected that data updates will be sent to those EDCs and times at which it is not. The group ID allows sleep intervals of a group of EDCs 120 to be simultaneously adjusted. For example, in a retail environment, a particular group ID may be allocated to all EDCs 150 located in a particular department.

As noted above, the BNC 120 coordinates a beacon-enabled PAN used to provide signalling and control information to EDCs 150. In some embodiments, the BNC 120 transmits beacons 301, 302 at a beacon interval of 61ms. In order to provide spatial diversity, a BNC may comprise a plurality of antennas. In one embodiment, a first beacon is broadcast from a first antenna and a second beacon is broadcast from a second antenna, before repeating the sequence from the first and second antennas. This minimizes a probability of EDCs 150 being located in an area of poor signal reception. An EDC 150 synchronizes to receive either the first or second beacon to avoid excessive power consumption receiving both beacons. Frequent transmission of beacons enables embodiments of the present invention to have low latency. That is, data can be quickly sent to an EDC 150 by notification using the NCC 470 beacon field and subsequent data downloading from a DLC 130. However, frequent reception of beacons 301, 302, particularly by EDCs 150 which may be battery-powered, consumes an appreciable amount of power.

Embodiments of the present invention may reduce power consumption with respect to beacon reception in one or both of two ways.

Firstly, an EDC 150 maintains an amount of time for which they are capable of receiving wireless communications to at a predetermined minimum. Secondly, EDCs 150 are arranged to sleep for a predetermined number of beacons. That is, an EDC 150 is arranged to enter a low-power state for a period which is longer than a beacon broadcast interval, and is preferably approximately a multiple of beacon broadcast interval, such that the device periodically wakes to receive every nth beacon. Both of these techniques are as explained in co-pending application Ser. No. 12/239,319 which is herein incorporated by reference for all purposes.

It has been determined that increasing a beacon "skip" multiplier (the number of beacons which an EDC 150 misses whilst in the low-power state) or the duration for which a device resides in the low-power state, is expected to have a great influence on battery life, as demonstrated in the table below which is based upon power consumption calculations.

| Average beacon skip interval (seconds) | Expected Battery Life (Years) |
| --- | --- |
| 2 | 2.5 |
| 3 | 3.4 |
| 5 | 4.7 |
| 10 | 6.7 |
| 15 | 7.8 |

However, as noted above, increasing the beacon skip interval has a detrimental effect on latency, such that a beacon skip interval should be chosen which maximizes battery life whilst providing acceptable latency. A maximum acceptable beacon skip interval is expected to be around 1 minute, based upon an expected drift of a low frequency sleep-state clock. It is envisaged that longer beacons skip intervals may be utilized during times at which infrequent data updates are expected to be sent to EDCs 150, such as overnight. Thus, the beacon skip interval may be varied in embodiments of the invention, dependent upon a time of day.

In embodiments of the present invention, low power consumption may be achieved with low latency by actively varying a beacon skip interval for a group of EDCs 150 upon instruction by a BNC 120. At any one time, a maximum of one EDC 150 per DCL 130 is instructed to receive data from a DLC 130. This prevents a plurality of EDCs 150 attempting to receive data simultaneously from the DLC 130 using contention based access, thereby wasting power. However, if each EDC 150 has a sleep interval of several seconds e.g. 1 minute, a process of communicating data to a number of EDCs 150 e.g. 1000 EDCs 150 would take a considerable amount of time since each EDC 150 would have to wake to receive a data download command from the BNC 120.

In order to overcome this problem, in some embodiments of the present invention, the BNC 120 notifies a group of EDCs 150 to change their beacon skip interval, such that each EDC 150 in the group may be quickly instructed to receive data. In this way, data can be communicated quickly to EDCs 150 in the group, whilst other EDCs 150 not in the group only wake periodically e.g. still at 1 minute intervals.

In more detail, following an update being received by an EDC 150, a successive EDC 150 in that group 150 can be notified via the NCC 470 to receive an update as quickly as possible. A group of EDCs 150 may be notified to change their beacon skip interval by a command in the NCC 470 which informs a group of devices having a corresponding group ID to change their beacon skip interval. EDCs 150 in that group then reduce their beacon skip interval accordingly and individual EDCs 150 within the group of EDCs 150 may then be instructed to receive data from the DLC 130. For example, EDCs 150 in a group may be instructed to reduce their beacon skip interval from 10 seconds to 0 in order to receive every beacon broadcast by the BNC 120. This allows longer beacon skip interval to be used when data is not waiting for EDCs 150, with the beacon skip interval then being reduced for a group of EDCs 150 which are to receive data.

Figure 6:
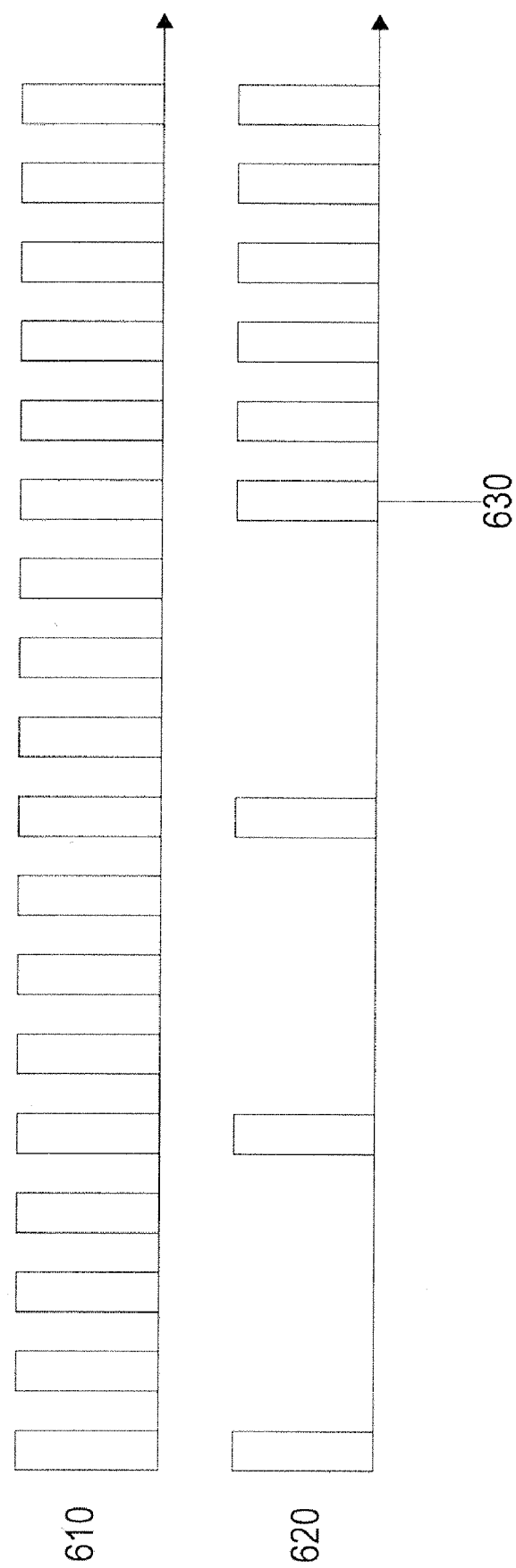
FIG. 6 illustrates a sequence of beacons broadcast by a BNC and beacons received by an EDC.

A method of changing a beacon skip interval for a group of devices will be described in more detail with reference to FIG. 6. FIG. 6 shows a series of beacons 610 periodically broadcast by a BNC 120. Beacons 620 received by an EDC 150 having a sleep period determined such that the EDC 150 receives only every $4^{th}$ beacon broadcast by the BNC 120. However, in order to reduce a latency of the server 101 communicating data to a group of EDCs 150, a command is inserted into the NCC field 470 of beacon 630 containing a group ID of EDCs including the EDC 150 receiving beacons 620. The command instructs all EDCs 150 in that group to reduce their beacon skip interval. In the example shown in FIG. 6, the EDC 150 reduces it's sleep duration to subsequently receive every beacon broadcast by the BNC 120. However, it will be realized that the command could instruct EDCs 150 in the group to reduce their beacon skip interval to any value, for example to receive every $2^{nd}$ beacon broadcast by the BNC 120.

In some embodiments of the invention, in order to further improve data communication latency, whilst an EDC 150 of a first group of EDCs operating with a reduced beacon skip interval is downloading data from a DLC 130, the BNC 120 instructs a second group of EDCs 150 to operate according to a reduce beacon skip interval. Thus, once all EDCs 150 of the first group have downloaded data from the DLC 130, the BNC 120 can begin to sequentially instruct EDCs 150 from the second group to download data from the DLC 130. In this way, little or no delay exists between a last EDC 150 of the first group downloading data from the DLC 130 and a first EDC from the second group downloading data from the DLC 130.

Some embodiments of the present invention perform channel management to ensure that a channel on which either a BNC 120 or DLC 130 WPAN currently operates is a best available channel. It may be necessary to periodically determine whether there is any interference on a WPAN channel, such as from a Wi-Fi network device operating within range of the DLC using the same frequency channels.

The DLC 130 may be arranged to periodically perform an energy (ED) scan, as defined in the IEEE 802.15.4 specification, to determine a peak energy in each channel. The ED scan may be performed during idle periods when the DLC is not transmitting any data to an EDC 150. Further, the DLC 130 may also periodically perform network discovery process. Using the result of the ED scan, the server 101 may determine that either the BNC 120 or DLC 130 WPAN should move to a new channel.

As a result of the above-described channel management process, the server 101 may determine that, for example, the BNC 120 WPAN should change to a different radio channel. In order to avoid any EDCs 150 becoming detached from the BNC WPAN, embodiments of the present invention communicate advanced notice of a channel change to EDCs 150 using a plurality of beacons.

Figure 7:
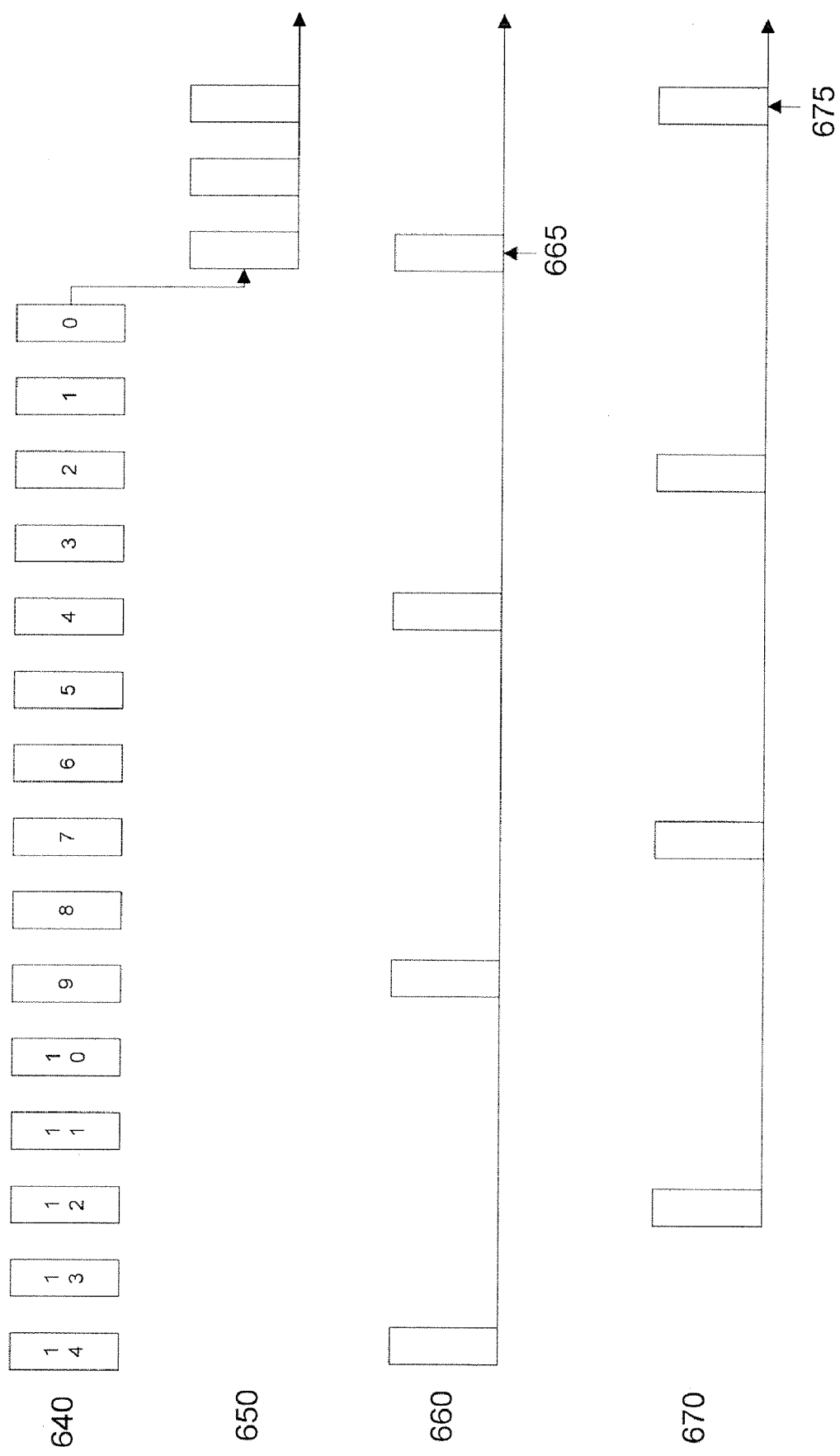
FIG. 7 illustrates a sequence of beacons broadcast by a BNC and beacons received by two EDCs during a channel change process.

As described above, EDCs 150 may have a sleep period a duration such that an EDC 150 only receives every nth beacon. Referring to FIG. 7, a series of beacons 640 broadcast by a BNC 120 on a first channel are shown. The server 101 determines that the first channel is no longer a best channel for the BNC WPAN and that the BNC 120 should move to operate on a second radio channel 650. However, rather than immediately moving to the second channel 650, the server 101 instructs the BNC 120 to notify EDCs 150 in a plurality of beacons that a channel change will occur in a number of beacons time. Alternatively, the BNC 120 may notify EDCs in a plurality of beacons that a channel change will occur in a period of time. For example, the BNC 120 inserts into the a command into the NCC field 470 instructing EDCs 150 associated with the BNC 120 that it will change to the second radio channel in a number of beacons time. FIG. 7 shows a decreasing number in the beacons 640 broadcast on the first channel indicating a number of beacons until the channel change occurs. This allows all EDCs 150 to determine when the channel change will occur, despite the EDCs 150 not receiving every beacon.

FIG. 7 further shows a series of beacons received by a first EDC 660 and a second EDC 670. The first and second EDCs 660, 670 have a beacon skip interval such that they receive every $5^{th}$ beacon. However, the first and second EDCs 660, 670 do not receive the same beacons. The BNC 120 begins to broadcast beacons indicating that a channel change to the second radio channel will occur in a 14 beacon's time. In each subsequent beacon, the value is successively decremented until the channel change occurs. The EDCs 660, 670, upon receiving the beacons indicating the future channel change, determine whether a channel change will occur before the next beacon to be received and thus change radio channels at an appropriate time. The first EDC 660 determines that the channel change occurs at beacon 665 and thus changes radio channel to receive that beacon, which is the first beacon broadcast on the second channel 650 by the BNC 120. Meanwhile, the second EDC 670 determines that the channel change occurs whilst it is sleeping and changes channel in time to receive beacon 675. In this way, EDCs 660 670 are notified in advance of the impending channel change and may change radio channels at an appropriate time to continue receiving beacons, even though each EDC 660, 670 does not receive every beacon.

The NCC 470 is used to indicate to an EDC 150 the existence of data for that EDC 150 will be explained with reference to FIGS. 8 and 9. Data for an EDC is provided to the controller 120 from the server 101.

The method starts in step 710 wherein the presence of data for a particular EDC 150 is notified to the BNC 120 from the controller 110. In step 720 the BNC 120 indicates that data is waiting for the EDC 150 by inserting an ID of the EDC 150 in the NCC field 470 which is broadcast in the beacon 301 to all EDCs 150 associated with the BNC 120 to which the EDC 150 belongs. Once notified of the pending data, the EDC 150 associates with the non-beaconing PAN of the DLC 130 in step 730. In step 740, once associated with the DLC 130, the EDC 150 requests the data from the DLC 130 and in step 750 the data is transmitted to the EDC 150 from the DLC 130. Once the data has been received by the EDC 150 from the DLC 130, the EDC 150 re-synchronizes with the beacons broadcast by the BNC 120 in step 760. The method ends in step 770.

The method described with reference to FIG. 7 may be repeated for one or more EDCs 150 to which data is to be communicate, so that the EDCs 150 sequentially receive data from the DLC 130. However, in another embodiment in which a BNC 120 coordinates data transmission from multiple DLCs 130, whilst one EDC 150 is receiving data from a DLC 130, the BNC 120 instructs another EDC 150 to receive data from another DLC 130. Thus, data may be communicated to a plurality of EDCs 150 more quickly.

Figure 8:
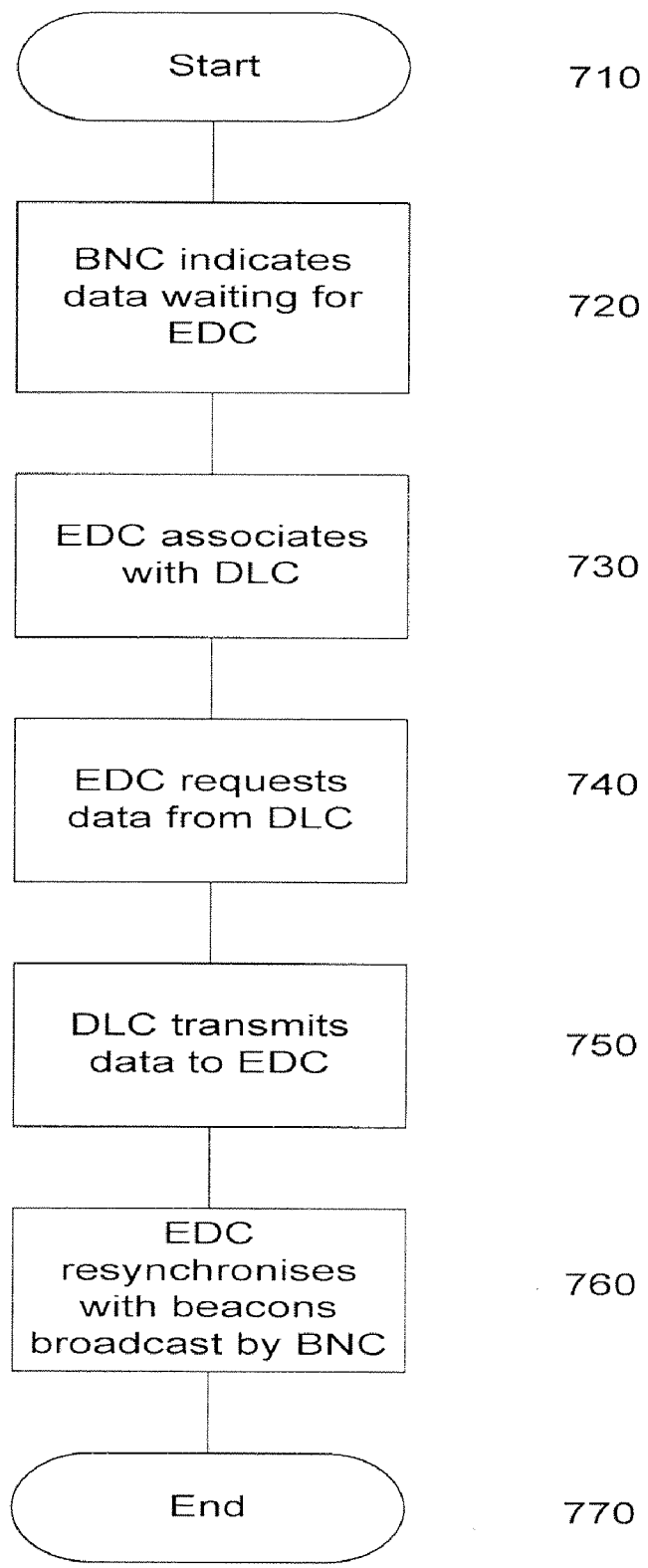
FIG. 8 illustrates a data download method according to an embodiment of the present invention.
Figure 9:
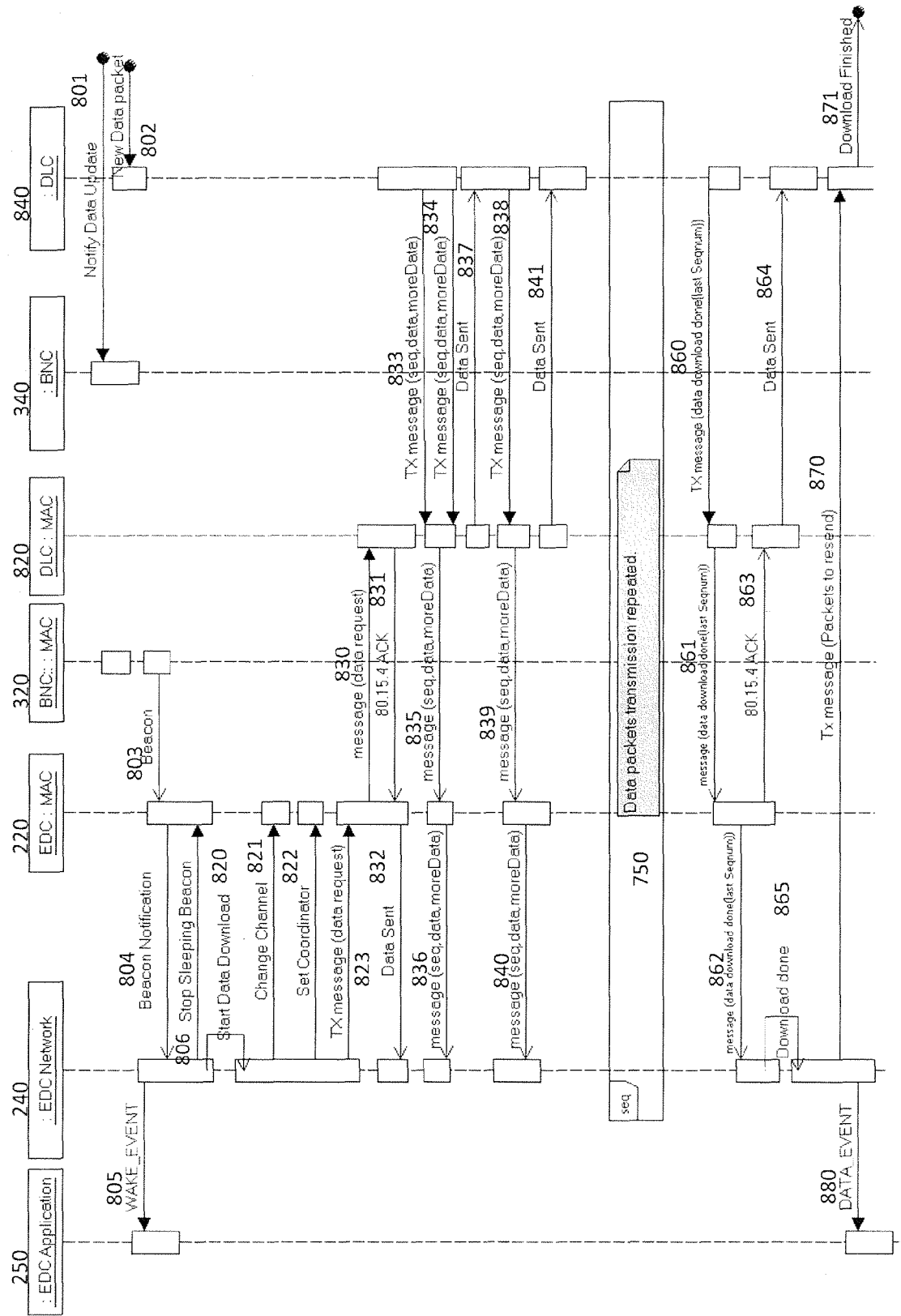
FIG. 9 illustrates a data download sequence of messages according to an embodiment of the present invention.

FIG. 8 shows a diagram of a messaging sequence between the EDC 150, BNC 120 and DLC 130 implementing the exemplary method of FIG. 7.

In step 801 the controller 110 notifies the BNC application layer 340 of the presence of data. In step 802, data to be sent to an EDC 150 is forwarded by the controller 110 to an application layer 840 of the DLC 130. In step 803, the BNC 120 notifies the EDC 150 for whom the update is destined of the presence of the data by the MAC layer 320 of the BNC transmitting a beacon which identifies the particular EDC 150 and indicates that data is waiting using the NCC field 470. In step 804 the EDC MAC layer 220 notifies the EDC network layer 240 of the beacon and, in response, the network layer 240 issues a notification to the EDC application layer that it should wake from a power saving mode in which the EDC 150 may be operating. The EDC network layer 240 also instructs the MAC layer 220 in step 806 to stop sleeping during beacon transmission, such that all beacons will be received by the EDC 150. A data download operation begins in step 820 and the EDC network layer 240 instructs the MAC layer 220 in step 821 to change channels to a channel on which the DLC 130 operates. Once on the correct channel, the EDC network layer 240 instructs the MAC layer 220 in step 822 to associate with the DLC 130 as a coordinator of the DLC WPAN. In step 823, the EDC network layer 240 instructs the MAC layer 220 to transmit a data request message over the air interface to the DLC and, in step 830, the EDC MAC layer 220 transmits the message to the MAC layer 820 of the DLC 130 via the ACC, receipt of which is acknowledged in step 831. The EDC MAC layer 220 acknowledges to the EDC network layer that the message was sent to the DLC 130 in step 832. The data to be sent from the DLC 130 to the EDC 150 is passed from the DLC application layer 840 to the DLC MAC layer 820 in one or more steps 833, 835 and the data is sent over the air interface from the DLC MAC layer 820 to the MAC layer of the EDC 150 in step 835 and from the EDC MAC layer 220 to the EDC network layer 240 in step 836. The DLC MAC layer 820 reports that the data was sent to the DLC application layer 840 in step 837. In response, the DLC application layer 840 may forward further data to the to the EDC network layer in steps 838, 839, 840, 841 which may again be repeated in step 850, depending upon the amount of data to be sent to the EDC 150. Once all data has been sent, the DLC application layer 840 notifies the DLC MAC layer 820 in step 860 and the MAC layer 820 forwards the notification over the air interface to the EDC MAC layer 220 in step 861, which further forwards the message in step 862 to the EDC network layer 240. The EDC MAC layer acknowledges the message in step 863, the acknowledgment being notified to the DLC application layer 840 in step 864. If any packets need to be re-sent to the DLC 150, then the EDC network layer notifies the EDC application layer in step 770 of the packets to be re-sent. Once complete, the DLC informs the controller 110 that the data has been sent to the EDC 150 in step 871 and the EDC network layer 240 informs the EDC application layer 250 in step 880 by issuance of a data event notification of the data having been received. The EDC application layer 250 may then deal with the data as necessary, for example by updating a display of the EDC 150 to display the received data.

It will be appreciated that embodiments of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A communication system, comprising:
   a first wireless network including a coordinator and a plurality of network devices associated with the coordinator, wherein the first wireless network is a beaconing wireless network used to provide signaling and controlling information to the plurality of network devices; and
   a second wireless network, wherein the second wireless network is a non-beaconing wireless network;
   wherein the coordinator of the first wireless network is arranged to notify at least one network device of the availability of data; and
   wherein the at least one network device notified of the availability of data is arranged to:
     associate with the second wireless network,
     receive the data via the second wireless network, and
     re-synchronize with beacons of the first wireless network once the data has been received from the second wireless network by the at least one network device,
   wherein a network layer of the at least one network device instructs a MAC layer of the at least one network device to change channels to a channel on which the second wireless network operates.

2. The communication system of claim 1, wherein the coordinator of the first wireless network notifies the at least one network device of the availability of data in a synchronous signal broadcast by the coordinator.

3. The communication system of claim 2, wherein the synchronous signal is a beacon.

4. The communication system of claim 1, wherein the at least one network device is arranged to associate with a coordinator of the second wireless network prior to receiving the data.

5. The communication system of claim 1, wherein:
   the plurality of network devices are arranged to periodically wake from a low power state at a first frequency to receive synchronous signals broadcast by the coordinator of the first wireless network;
   the coordinator of the first wireless network is arranged to instruct at least some of the plurality of network devices, including the at least one network device to be notified of the availability of data, to periodically wake from the low power state at a second frequency, which is greater than the first frequency, to receive synchronous signals broadcast by the coordinator.

6. The communication system of claim 5, wherein the synchronous signals are broadcast by the coordinator of the first wireless network on a first channel and the coordinator is arranged to include in a plurality of synchronous signals channel-change information.

7. The communication system of claim 6, wherein the channel-change information indicates when the coordinator of the first wireless network will begin to broadcast synchronous signals on a second channel.

8. The communication system of claim 7, wherein the plurality of network devices associated with the first wireless network are arranged to change to the second channel to continue receiving synchronous signals broadcast by the coordinator.

9. The communication system of claim 1, wherein the first and second wireless networks are ad hoc networks.

10. The communication system of claim 6, wherein the first and second wireless networks are based on an IEEE 802.15 standard.

11. A communication method, comprising:
- notifying at least one network device associated with a first wireless network of the availability of data, wherein the first wireless network is a beaconing wireless network used to provide signaling and controlling information to the at least one network device; and
- the at least one network device associating with a second wireless network, receiving the data via the second wireless network in response to the notification, and re-synchronizing with beacons of the first wireless network once the data has been received from the second wireless network by the at least one network device, wherein the second wireless network is a non-beaconing wireless network, wherein the at least one network device associating with the second wireless network comprises a network layer of the at least one network device instructing a MAC layer of the at least one network device to change channels to a channel on which the second wireless network operates.

12. The method of claim 11, wherein the notifying of the availability of data comprises including in a synchronously broadcast signal an indication that data is available for the at least one network device.

13. The method of claim 11, comprising associating with the second wireless network to receive the data.

14. The method of claim 12, comprising
- periodically waking a plurality of network devices from a low power state at a first frequency to receive synchronous signals broadcast in the first wireless network;
- instructing one or more of the plurality of network devices, including the at least one network device to be notified of the availability of data, to periodically wake from the low power state at a second frequency, which is greater than the first frequency, to receive synchronous signals broadcast in the first wireless network.

15. The method of claim 12, comprising broadcasting a plurality of synchronous signals including channel change information indicating that a channel on which the signal is synchronously broadcast will change.

16. The method of claim 15, comprising receiving at least one of the synchronous signals including channel change information and determining a point at which to change channel in order to continue receiving the synchronously broadcast signal.

* * * * *